United States Patent [19]
Golicz et al.

[11] Patent Number: 6,090,031
[45] Date of Patent: Jul. 18, 2000

[54] TILTING STACKER FOR FANFOLD SHEET

[75] Inventors: Stefan G. Golicz, Essex; Roman M. Golicz, Clinton, both of Conn.

[73] Assignee: Documotion, Inc., Old Saybrook, Conn.

[21] Appl. No.: 09/263,363

[22] Filed: Mar. 5, 1999

Related U.S. Application Data

[60] Provisional application No. 60/077,408, Mar. 10, 1998.

[51] Int. Cl.[7] .............................. B31F 1/00; B65G 57/00
[52] U.S. Cl. ...................... 493/416; 493/410; 414/798.2; 414/790.7; 414/790.1
[58] Field of Search ..................................... 493/410, 412, 493/416; 414/790.1, 790.7, 798.2

[56] References Cited

U.S. PATENT DOCUMENTS

| | | | |
|---|---|---|---|
| 3,387,720 | 6/1968 | Wilkin | 414/790.1 |
| 3,887,088 | 6/1975 | Fernandez-Rana et al. . | |
| 4,756,606 | 7/1988 | Marass | 414/788.9 |
| 5,061,233 | 10/1991 | Schultz et al. | 493/416 |
| 5,273,516 | 12/1993 | Crowley . | |
| 5,516,256 | 5/1996 | Ellis | 414/757 |
| 5,746,568 | 5/1998 | Ogawa et al. | 414/790.7 |

Primary Examiner—John Sipos
Assistant Examiner—Steven Jensen
Attorney, Agent, or Firm—C. G. Nessler

[57] ABSTRACT

An apparatus and method for forming a stream of shingled fanfold sheet device into a vertical stack comprises a first table having lengthwise belts which receive and push the shingled sheet against a stop, causing the sheet to form into a horizontal stack. The first table has powered transfer rollers positioned in the spaces between the belts. Upon command, the belts lower beneath the table surface, so that the transfer rollers engage the stack and move it sideways onto an adjacent pivotable second table. The second table pivots about an axis transverse to the lengths of the first table and second table. Preferably, the second table has a stop at one end and a detachable pallet at the other end. When the second table is rotated, the stack is made vertical so it rests on the pallet. The pallet with stack are then withdrawn from engagement with the second table for transport elsewhere. A third conveyor belt table may be positioned between the source device and the first table. Preferably, the pallet and stop may be attached interchangeably to opposing ends of the tilting table, to enable the rotational direction of the table to be reversed, and as a result, the top to bottom sequence of fanfold pages within the vertical stack is reversed.

17 Claims, 4 Drawing Sheets

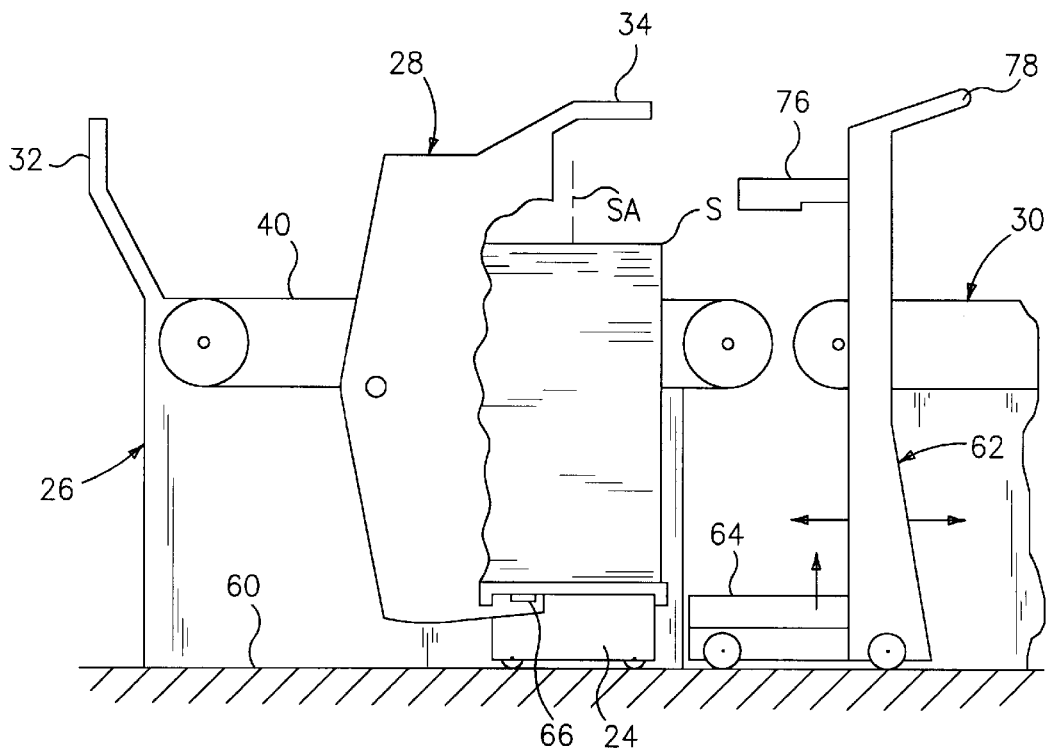
FIG. 5
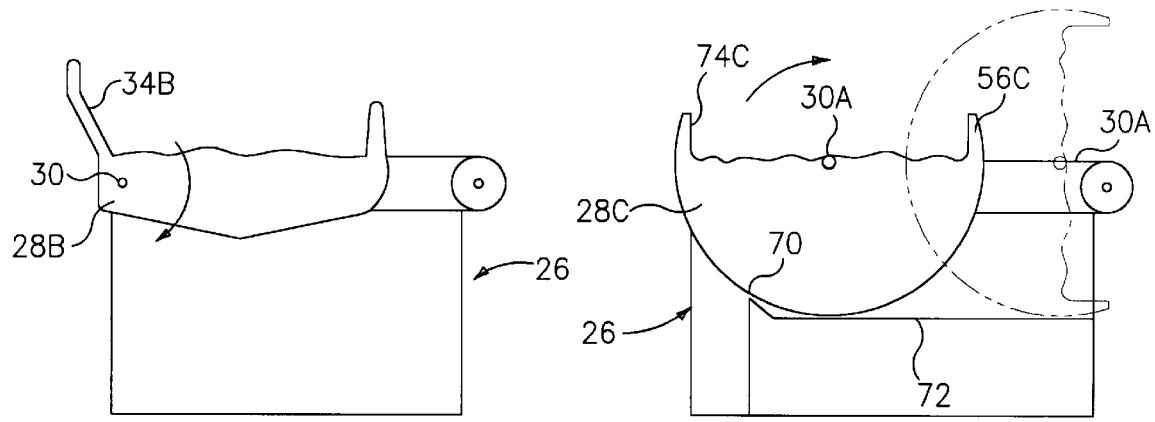
FIG. 8
FIG. 9

TILTING STACKER FOR FANFOLD SHEET

The present invention claims benefit of provisional patent application Ser. No. 60/077,408, filed Mar. 10, 1998.

FIELD OF INVENTION

The present invention relates to devices for handling and stacking fanfold sheets of paper and other materials.

BACKGROUND

Fanfold sheet refers to a continuous sheet having spaced apart transverse perforations which enable the sheet to be accumulated as a stack by zig-zag folding of the sheet. Such sheet is also variously referred to as fanfold printed forms, and the individual segments are referred to as pages or forms. Typically, when a fanfold sheet issues in shingled fashion from a machine, such as a folder or a printer, segments of the sheet must be gathered together as vertical stacks so they can be either transported or further processed. For instance, the sheet may be subsequently fed to a binder, or other finishing machine. Typical fanfold sheet finishing processing machines are adapted to draw fanfold sheet from stacks which are "normally oriented". That is, the sheets are parallel to the floor or earth surface, and the stack axis is by definition normal to the floor.

In one of the simpler manual ways of effecting such a process, an operator will pick a spot along the length of the shingled sheet issuing from the source device, and tear the sheet at a perforation to create a separate segment of sheet comprised of a desired number of pages. Then, the operator will manually gather together the segment of sheet by laterally pressing it, to form the sheets into a stack "on edge". Next, the operator will press the ends of the stack toward each other, pick the stack up from the work surface while rotating it to a vertical position, and then put the stack onto a dolly, pallet or the like, for transport to the finishing machine.

Gathering shingled sheets into stacks by means of machines is something that has been addressed in the prior art. For instance, Fernandez-Rana et al. in U.S. Pat. No. 3,887,088 describes apparatus for forming a vertical stack of signatures (i.e., folded newspapers) which are delivered to the apparatus in shingled fashion. The apparatus comprises a tilting table which is loaded with signatures by belts running alongside the tilting table.

Crowley in U.S. Pat. Nos. 5,630,780, 5,399,143, and 5,273,516 discloses apparatus and method which aid in accomplishing the desired result for fanfold sheet. The patents describe how fanfold sheet moves from the output of a folder onto an in-line tilting table. When sufficient sheet has been accumulated on the flat surface of a tilting table, and manually pushed into a stack by the operator, a door or gate rises at the input end of the table. The table is tilted to make the table surface vertical, and to cause a stack to be gathered and supported on the surface of the gate. A separate device such as a dolly, is positioned under the gate of the vertically tilted table; and when the gate is retracted, the stack drops onto the top of the dolly, so it can be moved elsewhere. During those steps, a flap at the end of the output conveyor of the source device rises up to block the flow of shingled sheet, preventing it from falling onto the floor.

By design of the Fernandez-Rana and the Crowley devices, when the vertical stack is formed, the pages of the stack are in a pre-determined orientation, relative to the sequence in which the sheet/signatures issue from the source device. In particular, in the Crowley device, when the stack is rotated, the first part of the sheet from the source (designated "A") is at the top of a vertical stack. This is the so-called A-Z orientation. In the Fernandez-Rana device, the opposite, or Z-A orientation, is effected. What an operator may desire with respect to stacking orientation can depend on what the subsequent processing machine demands. In general, in the prior art devices it is either not feasible or difficult for the operator to alter the stack orientation.

The present invention seeks to accomplish the same general goals as the prior art manual and machine methods, but with a device which has advantages in cost or performance over those.

SUMMARY

An object of the invention is to provide apparatus and method for forming shingled fanfold sheet into stacks having a vertical orientation, A further object of the invention is to enable stacks which are so made to be transported and used on machines remote from the machine from which the shingled sheet is issued initially. A still further object is to enable stacks to be selectively configured in both the A-Z and Z-A stack configurations.

In accordance with the invention, apparatus for changing the orientation of horizontal stacks so they become vertical stacks comprises a table, the length of which is pivotable about a horizontal axis. The table has a series of lengthwise rollers and a member, preferably a detachable pallet, at one end, to support the stack when the table is pivoted to a vertical position.

In further accordance with the invention, apparatus for forming shingled fanfold sheet into a vertical stack comprises at least two tables. A first table receives the sheet from a source and forms it into a horizontal stack by pushing it against a stop. Then, the stack is moved sideways onto a tiltable second table adjacent the first table, preferably parallel thereto. Then, the second table is tilted from a horizontal to a vertical position, to cause the stack to be supported on a member projecting from one end of the second table. Preferably, the stack support member is a disengageable pallet.

Preferably, the first table has a series of belts which move the shingled fanfold sheet and form the stack by lengthwise motion; and the horizontal stack is moved sideways by a plurality of driven rollers, interspersed lengthwise between the belts. When the horizontal stack has been formed by action of the belts, the belts lower, so that the stack is supported on the moving rollers and thereby translated onto the tiltable second table.

Preferably, the member at the end of the second tiltable table is a detachable wheeled pallet, engaged with forks which project upwardly from the horizontal surface of the tilting table. The pallet is held in place by a either magnets or mechanical engagement, or the combination. When the table is in its vertical position, the pallet is either wheeled away, or more preferably, lifted by the motorized platform of a wheeled hand cart. Preferably, such cart also has an arm which presses downwardly on the stack top, to hold the stack steady in place during transport to another location. When the pallets are deposited at the other location, such as a finishing machine, they are preferably hooked up in daisy chain fashion for continuous feeding of stacked sheet to the machine.

Preferably, there is a third table, positioned between the first table and the output conveyor of the device which is the source of the shingled sheet. The third table has lengthwise belts to move the sheet from the source device to the first table. The third table facilitates cutting of the fanfold sheet, to enable segments to be formed into stacks which can be made vertical. Preferably, the first table has belts running at a linear speed slower than the speed of the fanfold sheet delivered from the source device; and, when the third table is present, its speed is intermediate the speed of the first table and the source device.

In accord with the invention, apparatus for changing the orientation of horizontal stacks so they become vertical stacks comprises a table, the length of which is pivotable about a horizontal axis, having a series of lengthwise rollers and a member, preferably a detachable pallet, at one end, to support the stack when the table is pivoted to a vertical position.

The foregoing and other objects, features and advantages of the present invention will become more apparent from the following description of preferred embodiments and accompanying drawings.

BRIEF DESCRIPTION OF THE DRAWINGS

FIG. 5 is a side elevation view of a portion of the apparatus shown in FIG. 1, showing a stack in a second table which has been rotated to a vertical position, and showing a pallet transport cart approaching the second table.

FIG. 8 is a side elevation view analogous to FIG. 2, showing an alternate embodiment tiltable second table, where the pivot point is at one end of the table.

FIG. 9 is like FIG. 8, showing another alternative embodiment tilt table, where the table has a semi-circular base which rolls along a pedestal.

DESCRIPTION

In this description a fanfold sheet is comprised of spaced apart perforations which define pages, or forms, so the sheet is adapted to be folded in zig-zag fashion into a stack. It is assumed in this description that the fanfold sheet is provided by a source device such as a printer or folder which has an output conveyor. Typically, the sheet will be paper, but it may be other kinds of material.

In this description, sheet issuing from the source device is moving in shingled fashion on a output conveyor. The mechanics of the fanfold sheet dictate that the zig-zag cannot be precisely on the perforations when the sheet SH lies over at an angle of 10–45 degrees from the horizontal as suggested by FIG. 7. In this condition, the sheet herein is referred to as a shingled (fanfold) sheet in distinction from a stack. However, referring again to FIG. 7, when a segment of fanfold sheet is cut from the main run of sheet and the segment is gathered so that the pages become nearly vertical, i.e., they lie at an acute angle to the vertical plane, the sheet is referred to comprising a (horizontal) stack. The stack axis SA is that axis which runs axially through the centerpoints of the planes of the folded sheets. A stack having sheets parallel to the floor is called a vertical stack.

Figure 1:
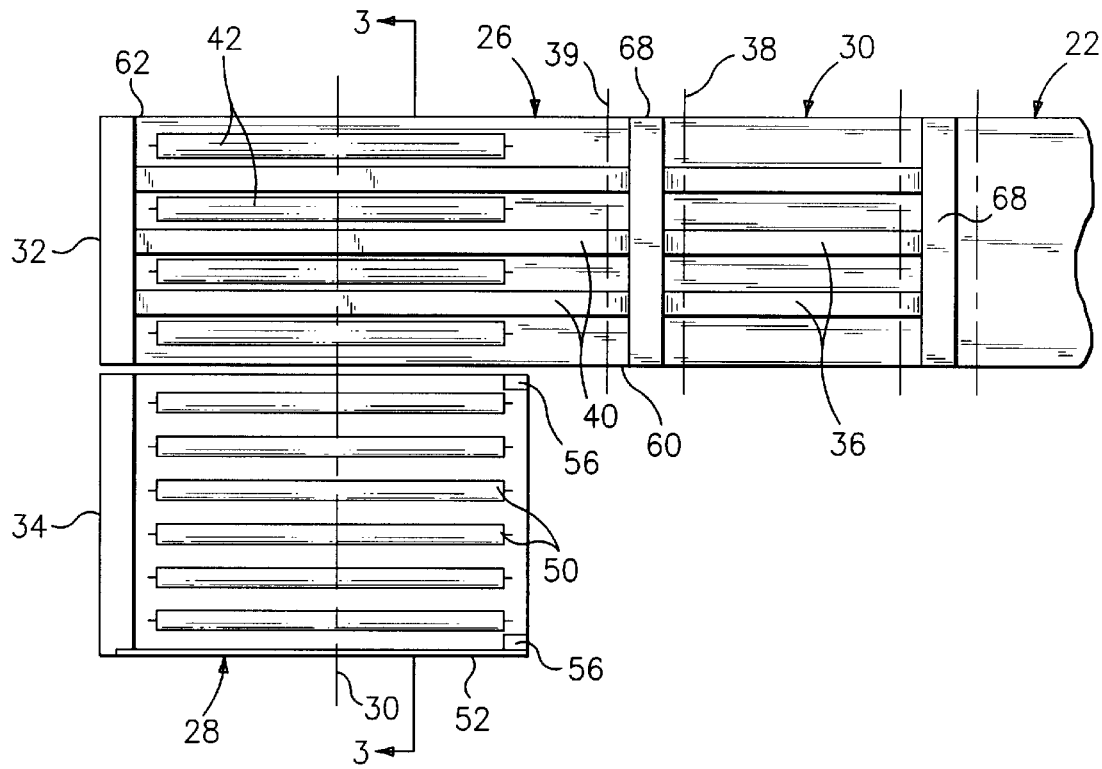
FIG. 1 is a top view of a first, second and third tables and a portion of the output conveyor of a source device.
Figure 2:
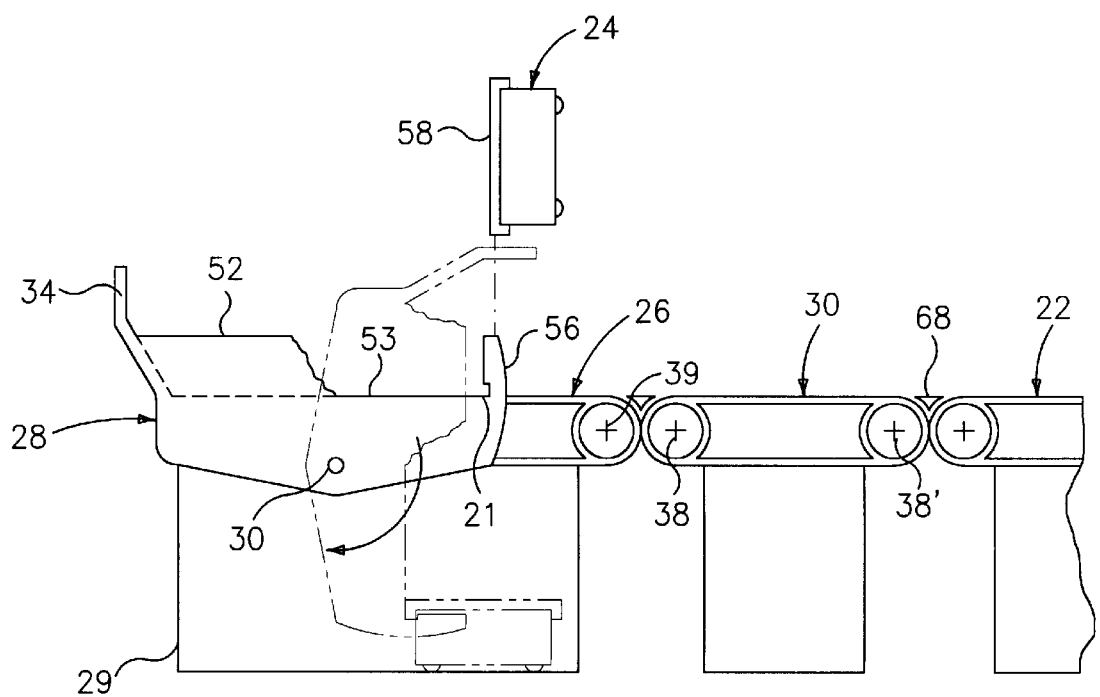
FIG. 2 is a side elevation view of the apparatus shown in FIG. 1.
Figure 3:
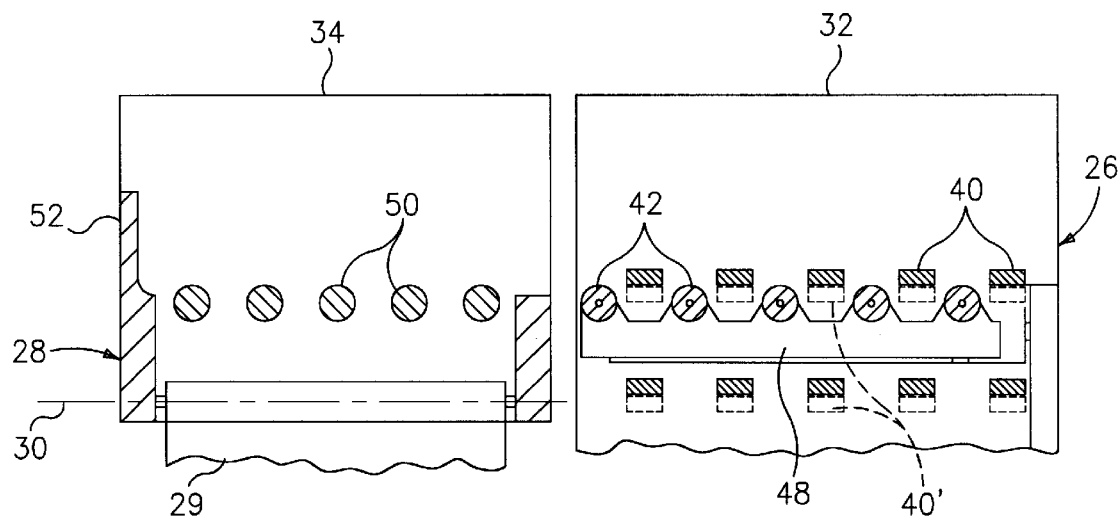
FIG. 3 is an end elevation cross sectional view of the apparatus shown in FIG. 1.

FIG. 1 is a simplified top view of the major parts of the apparatus. FIG. 2 is a corresponding side elevation view. FIG. 3 is a cross sectional elevation view through the apparatus shown in FIG. 1 and 2. For purposes of simplicity and clarity, the supporting bases and mechanical detailing, along with actuators, are not shown in the drawings of the apparatus Such things and their variations will be obvious to the skilled artisan from the description which follows.

The general functioning of the apparatus is as follows: Shingled fanfold sheet is delivered by a source, e.g., the output conveyor 22 of an unshown printer, to the apparatus. A portion of the sheet is then formed into a horizontal stack. The stack is then simultaneously rotated to a vertical orientation and deposited upon the surface of a pallet. The pallet with the stack on it may then be taken away for further processing of the sheet.

The preferred apparatus is essentially comprised of a stationary first table 26, and a tilting second table 28, positioned adjacent to and parallel to the first table. For simplicity in this part of the description, the tilting table 28 is cantilever mounted off the base 29 of the first table. The table 28 may be independently supported, and it may be positioned on the opposite side of table 26 from what is shown. Third table 30, which is optional but preferred, is positioned between the source output conveyor 22 and the first table and has its own base. Plates or flaps 68, supported off one or both table frames, are positioned within the joints between the mating tables to guide the flow of sheet from one table to the next. See FIG. 2 and 7.

Third table 30 has a surface comprised of an array of conventional conveyor belts 36 which run between opposing end rollers 38, 38'. Table 30 receives and delivers shingled sheet to table 26. When a desired quantity of sheet has passed across table 30 and onto table 26, the fanfold sheet is severed manually by an operator as described below. This enables the desired quantity of sheet to run onto the first table 26 and be accumulated as a stack.

Figure 7:
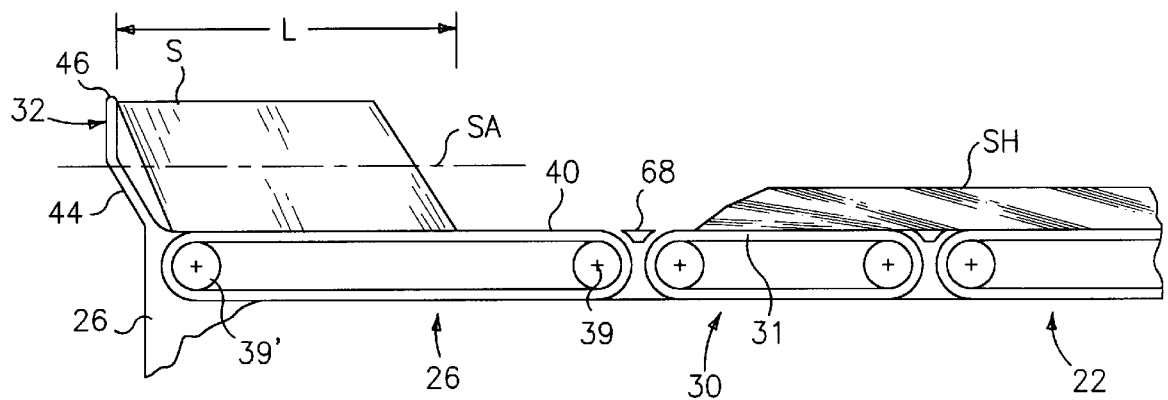
FIG. 7 is a side elevation view of the source conveyor, the third table and the first table, shown in FIG. 1, illustrating how a quantity of shingled fanfold sheet, severed from that passing across the third table, is formed into a stack on the first table.

The horizontal surface of table 26 which fanfold sheet contacts is alternatively comprised of orthogonal conveying means, in particular, a series of lengthwise belts 40 or transfer rollers 42, depending on what point of the operational sequence the machine is at. The elastomeric timing-type belts 40 are spaced apart, and they run over opposing end belt rollers 39, 39' movably mounted upon the base 29 of the table. One or both of the belt rollers are suitably driven by unshown motors. See the elevation view of FIG. 7. The lengths of the transfer rollers run parallel to the belt travel direction; thus, they are adapted for moving sheet transversely to the table length. When the shingled sheet runs onto the surface of table 26 at its first end 60, the sheet is first moved by the belts 40 toward the table second end 62. This causes the sheet to be thrust against the end stop 32 and to be formed into a horizontal stack resting edgewise on the first table surface. The pages at an acute angle from the vertical, as illustrated by FIG. 7. As also shown in FIG. 7 and other Figures, preferably the stop 32 has a lower end 44 lying at an oblique angle to the surface of table 26, to engage the leading edge of shingled sheet and thrust it vertically upward. The upper end 46 of the stop is essentially vertical. By design, the belts 40 will frictionally slip relative to the edges of the stack as the sheet accumulates and presses against the stop.

As illustrated by FIGS. 1 and 3, table 26 has a plurality of transfer rollers 42, having axes running lengthwise along table 26. The transfer rollers are interspersed between the spaced apart belts 40. The transfer rollers are supported by frames 48 at opposing ends of the table, one of which is show n in FIG. 3. When shingled sheet is being fed lengthwise along the table 26 by belts 40, the topmost points of the rollers 42 are lower the elevation of the belt surfaces. At the desired point in time, i.e., when the horizontal stack has been formed by piling up of the pages against the stop 32 due to the thrust of the belts, the rollers 39, 39' supporting the belts are lowered, to a position indicated by phantom lines 40' in FIG. 3. Thus, a stack previously resting edgewise on the belts becomes supported by the transfer rollers. Simultaneously with the belts being lowered, the transfer rollers are rotated by unshown means in the direction indicated by arrows in FIG. 3, causing the stack to move sideways, or transversely to the original path of the shingled sheet, onto second table 28.

Second table 28 has a first end, a second end, a length and a width, which correspond in orientation and direction with the same aspects of the first table 26. As illustrated by FIGS. 1 and 3, second table 28 has a plurality of idler rollers 50 with their primary rotational axes running lengthwise. Alternatively, the rollers may be driven, if the momentum of the stack imparted by the first table is insufficient to drive the stack to a desired position on table 28.

Table 28 has an end stop 34 which generally corresponds to the end stop 32 of the first table, to maintain the leading edge end of the stack in a near-vertical position. End stop 34 may be positioned slightly further from the source device than stop 32, to ensure a translating stack will not hit the edge of stop 34. If the table 28 is made sufficiently long, so its second end extends well beyond the stop of the first table, then no stop is required—even though pages at the end of a stack will tend to fall over, when the table is tilted they will be re-gathered onto the stack. Table 28 also has a side stop 52 to limit the transverse motion of the stack as it travels sideways across the table under impulse from the transfer rollers of the first table. In most of the Figures, the side stop 52 is cut away for purpose of illustration.

Figure 4:
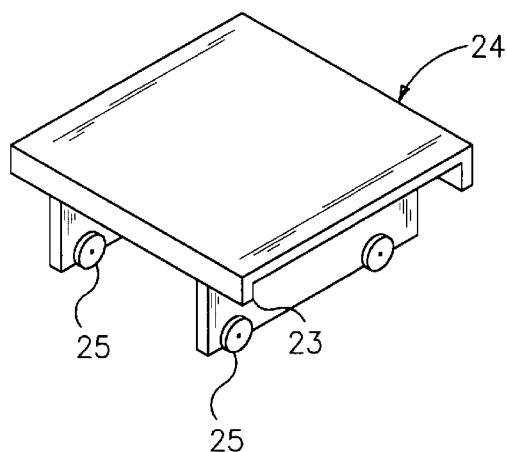
FIG. 4 is an isometric view of a pallet.

Prior to the point at which a stack is moved sideways onto second table 28, the operator attaches a pallet 24 to the vertical forks 56 at first end of the table 28. A typical preferred pallet, shown in FIG. 4, is simple in construction. It has four small wheels 25 to permit it to roll across a floor. The top of the pallet has a folded-down lip 23 at each end for structural strength and for engaging a mating part in the fork, as described below. Such a pallet is sometimes referred to as a dolly. The use of other shape and design of pallets, with and without wheels or lips, and with vertical stanchions or supports for the stack, is contemplated.

The first end of the table 28 has forks 56 which extend vertically from the surface on opposing sides of the table. See FIGS. 1 and 2. Preferably, each fork 56 is fitted with a low strength magnet 66, as illustrated by FIG. 5; and, each fork has a slot 21 to engage the lip of the pallet. See FIG. 2. The magnets keep the pallet in good contact with the fork prior to rotation of the tilting table, but at the same time allow easy disengagement later on, when the pallet with stack is removed from the table 28 for transport elsewhere. The engagement of the pallet top lip with the slots of the forks helps keep the pallet from sliding off the forks, as could happen when the apparatus is used in a way which causes the pallet wheels to contact the floor during rotation to vertical.

The second table 28 is pivotable about axis 30 which runs transverse to the lengths of the first and second tables. An unshown rotary motor or linear actuator may be employed to rotate the table. The stack which the operator produces on the first table will have a length L, where L, is less than the distance between the stop 34 and the top surface 58 of the pallet 24. See FIG. 4 and FIG. 2. When the stack has been transferred to the second table, the second table is tilted to a vertical position as indicated by the phantom view in FIG. 2. Rotation causes the stack to move toward and onto the pallet surface. In practice, the operator may pause the rotation of the second table as it approaches a steep incline, and then guide the stack downwardly toward the surface of the pallet. When the table is in a fully vertical position, as illustrated in FIG. 5, the pallet may be disengaged from the end of the table by a pallet transporting device 62. In an alternative embodiment, the pallet has wheels which contact the floor and lift the pallet slightly as the table reaches its vertical position, so the pallet can be wheeled away.

One way of stating the preferred process which the apparatus carries out is as follows: The sheet is gathered along a lengthwise path into a horizontal stack having a stack axis. It is then moved transversely to the path, so the stack axis is in a plane which is offset from the lengthwise path, preferably parallel thereto. The stack is then rotated so the stack axis is made vertical within the offset plane, as the stack is made to the top surface of the pallet or other stack support member. Thereafter, the pallet and stack are moved away from the apparatus, almost inevitably out of said plane.

Referring to FIG. 5, the preferred pallet transporting device is cart 62. The cart utilizes the essential design of the cart described in U.S. Pat. No. 5,647,720, owned and assigned in common with the present invention, the description and figures of which are hereby incorporated by reference. A screw or cylinder makes the pallet platform 64 of the cart move vertically up, upon operator command, when the platform is inserted beneath the center part of the pallet 24. The cart with the pallet on the platform is then manually wheeled away from the tilted table by the operator, who grasps the vertical stanchion and handle 78. The cart has a clamp 76 which presses downwardly on the top of the stack S, because of upward motion of the pallet platform 64. The clamp ensures that during transport the stack will remain in place and in good order on the pallet. The clamp can be preset at various predetermined elevations; and, in an alternate embodiment it may be powered for independent downward vertical clamping motion.

In the absence of optional third table 30, the following is a way in which the apparatus is used to form a stack from shingled sheet. When a desired quantity of shingled sheet has been drawn onto the first table 26, running at a speed less than the speed at which the source conveyor delivers shingled sheet, the sheet is cut by the operator at a perforation, using a knife like tool, at a point upstream from the joint between the first table and the source device conveyor. The operator then manually urges the tail end of the segment of sheet which has been severed onto the first table. The segment of sheet is formed into a stack on the first table by motion of the belts 40, as described above. Normally, it will not be necessary for the operator to momentarily manually retard the shingled sheet issuing from the source, as the stack forming and transfer will be completed before the sheet from the source starts to come onto the first table. Preferably, the operator will command the drive motor for belts 40 to speed up during this phase of the operation. Then, when the last part of the severed sheet segment ceases to move further toward the stop, the operator actuates suitable controls to lower the belts and cause the transfer rollers to engage the stack and translate it sideways onto the tilting table 30. The operator then commands the table to tilt vertically. Once the stack is moved from the first table, the shingled sheet coming from the source may advance again onto the first table, to repeat the cycle.

The presence of the third table 30 is preferred, as it facilitates the use of the apparatus as follows. Preferably, the belts 36 of the third table run at a speed which is less (for example, 95 percent or less) of the linear speed of the output conveyor 22 of the source device; and, the belts 40 of the first table run at a still lower speed (for example, 90 percent or less). Thus, there is a progressive impetus during sequential travel of sheet from the conveyor 22, to table 30, to table 26, for the shingled sheet to progressively gather or bunch up into a stack.

The preferred use of the three-table system is similar to the use of the apparatus in its absence. As shingled sheet travels across the third and first tables, the operator severs the sheet upstream of the joint between the source device and the third table, to select the quantity of sheet to be gathered into a stack on the first table. The operator then causes the belts of the first table and third table to both speed up and urges the trailing end of the severed portion from the source conveyor onto the third table. When the stack is fully gathered on the first table, the belts 40 are activated to lower and the rollers translate the stack sideways, as previously described. After the translation is effected, the belts of both tables are caused to resume their original or base speeds, so the first table becomes ready again to receive the shingled sheet which has been, during the foregoing steps, progressing toward the third table. Relative table lengths and speeds will be appropriately adjusted for any particular system to accomplish the foregoing process. In an example of the invention, the dimension and speeds of the source conveyor and two tables are as follows: The source has an output conveyor of 2–4 ft in length and a speed 0.73–4.2 fpm (feet/minute); the third table is 2 ft long and has a speed of 0.59–3.3 fpm; the first table is 4 ft long and had a speed of 0.47–2.6 fpm. When the first and third tables are run a high speed preparatory to the lateral transfer step, they run at 10–25 fpm. Other variations in relative speeds of the tables can be contemplated. For instance, the third table can be operated in such a manner that it mimics the operation of the source conveyor.

Figure 6:
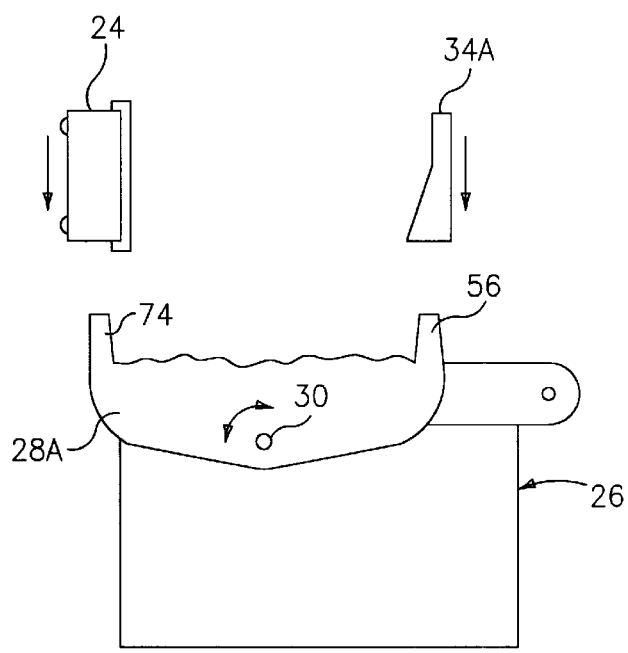
FIG. 6 shows an alternate embodiment second table having arms, with a disengaged pallet and end stop which are adapted to attach to the arms.

FIG. 6 illustrates an embodiment of second table 28A which is capable of tilting in opposing rotational directions, as desired. The table 28A has another set of forks 74 extending from the second (left) end, in addition to the first set of forks 56 which extend from the first (right) end. The stop 34A is a separate removable piece. Thus, the stop may be positioned on the forks 74, and the pallet on the forks 56, to form a second table configured like that shown in FIG. 2. Or, as indicated by FIG. 6, the pallet 24 may be engaged with forks 74 so it is attached to the second end, while the stop 34A is placed on the forks 56 at the first end. Thus configured, the table may be tilted to the left in the Figure. When configured as in FIG. 6, the apparatus will yield a stack having a Z-A configuration, whereas when configured in accord with FIG. 2, the stack will have an A-Z configuration. The configuration nomenclature refers to the progression of the pages from top to bottom of the stack. "A" refers to the end of the selected or severed shingled sheet segment which first runs onto the first table, while "Z" refers to the end of the segment end which last runs onto the first table. The operator can conveniently chose which stack orientation is desired with minimal reconfiguration of the equipment. When in the configuration shown in FIG. 6, the stop 34A has a limited function—principally, to keep any errant trailing end of stack from possibly falling off the first end of the table before tilting of the table.

FIG. 8 shows an alternate embodiment second table 28B which is adapted to pivot about an axis 30 which is positioned near the second end of the table and stop 34B. Other pivot locations are within contemplation. Moving the pivot toward the second end with the stop may be convenient in bringing the pallet mounted on a short length tilting table nearer to the floor than a center pivot table would.

For each of the foregoing embodiments of tilting tables, it will be evident that other means than a pivot axis can be employed to provide the desired rotational motion. For example, the second table 28 may be contained within a frame or cage which rides on rollers or within channels.

FIG. 9 shows yet another embodiment of tilting table, where the pivot axis 30A translates laterally during the rotary motion of the table 28C which is indicated by the arrow and phantom outline. The stop and pallet are omitted for clarity. The base of the table 28C is comprised of a circular arc which rests on the surface of support pedestal 72, and when actuated, the table rolls on the pedestal. Other means for achieving the desired combination of translation of the pivot axis with simultaneous rotation about the axis will present themselves.

Other means for attaching and detaching a pallet to a tilt table may be employed, instead of the above-described forks which engage the underside of the top of a pallet. For example, the pallet may have pins extending laterally, to engage sockets in the tilt table surface. For another example, releasable mechanical clamps may be used.

The apparatus may be used without a detachable pallet. A fixed end plate may substitute for the pallet at the first end of the tilting second table. Or a plurality of forks or tines may substitute for the pallet. When the table is tilted, the stack will be made vertical, and the stack can be mechanically or manually lifted off the end plate or forks for transport elsewhere. Or, in other situations, the sheet can be withdrawn from the top of the stack while it remains in place on the vertically tilted table.

While the particular belts and rollers which have been described are the preferred means of moving, or enabling the movement of, sheet and stacks on tables, it will be appreciated that other conveying means which carry out the same function may be substituted for them. And, while the preferred first table has belts which descend to enable the transfer rollers to form the table surface which supports a horizontal stack, other relative movement of the mutually orthogonal conveying means can accomplish the same result.

While the apparatus is shown in a preferred layout, as in FIG. 1, it will be appreciated that the invention may be embodied in apparatus where the first table is not directly in alignment with the source device output conveyor, and where the second table is non-parallel to the first table. It is well known that particular conveying devices can move objects around curves.

Figure 10:
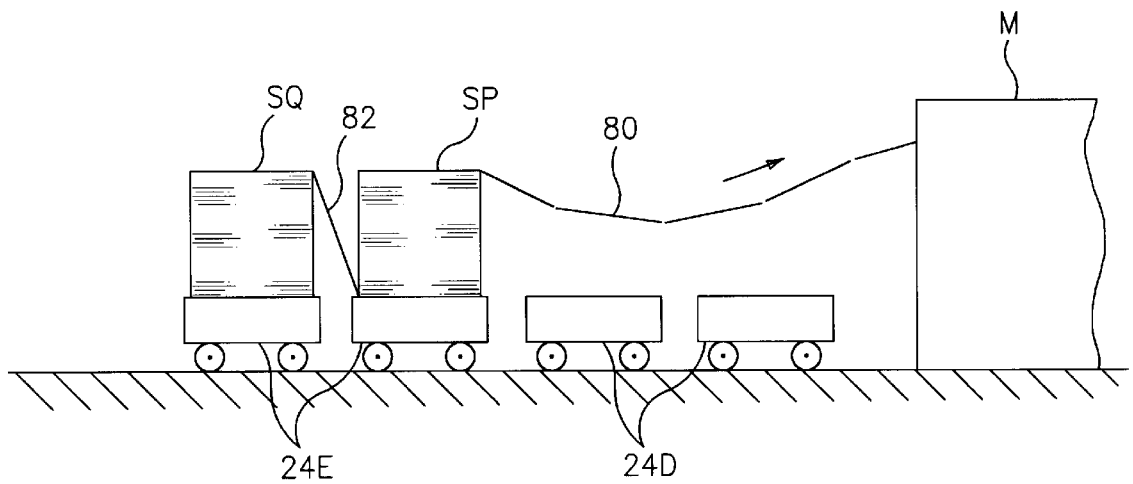
FIG. 10 is elevation side view of pallets lined up at the input end of a finishing machine, showing how fanfold sheet is withdrawn from the stacks on the pallets.

FIG. 10 illustrates how the pallets having the individual stacks upon them are employed to feed sheet 80 to a finishing machine M. The bottom most page, or footer, of one stack SP is connected to the top most page, or header, of the following stack SQ, as illustrated by the sheet at 82 in the Figure. This is called a daisy-chain hookup. In the figure, the stacks from pallets 24D have been depleted, and the sheet is being drawn from the top of the next-in-line of the pallets 24E.

Although this invention has been shown and described with respect to a preferred embodiment, it will be understood by those skilled in this art that various changes in form and detail thereof may be made without departing from the spirit and scope of the claimed invention.

We claim:

1. Apparatus for forming shingled fanfold sheet into a vertical stack comprising:

a first table, having a table surface, a first end, an opposing second end, a length and a width; the table adapted to receive shingled fanfold sheet upon the surface at the first end; the table having a stop at the second end for limiting lengthwise travel of said sheet;

the first table having first conveyor means, for said moving shingled sheet lengthwise against the stop, to thereby form the sheet into a horizontal stack; and, second conveyor means, for moving the horizontal stack transversely to the table length; said first and second conveyor means interchangeably engageable with sheet to thereby successively form said table surface, to enable said sheet to be first moved lengthwise, and then transversely, upon the table surface;

a second table, positioned adjacent to the first table, having a table surface, a first end, an opposing second end, a length and a width; the second table rotatable about a pivot axis running transverse to the first table length, from a horizontal table surface position to a vertical table surface position; wherein, when in the horizontal table surface position, the second table surface is adapted to receive a horizontal stack of sheet from the first table;

the second table having a stack support member attached to at least one end, the member adapted for supporting the base of a vertical stack when the table is in the vertical position;

wherein, after the horizontal stack is received on the second table, rotation of the second table from the horizontal table surface position to the vertical table surface position causes the stack to rest on the member as a vertical stack.

2. The apparatus of claim 1 wherein said stack support member of the second table is a pallet having a top surface for receiving the stack of sheets; and, further comprising: means for attaching and detaching the pallet from said at least one end of the second table; wherein, the pallet top surface is perpendicular to the surface of the second table when attached to the table.

3. The apparatus of claim 2 further comprising: means for attaching and detaching the pallet which include two forks extending upwardly from the surface of the second table; and, magnets on said forks, to hold the pallet onto the forks.

4. The apparatus of claim 2 wherein the first table has first means for conveying which comprises a plurality of belts and second means for conveying which comprises a plurality of rollers.

5. The apparatus of claim 2 wherein the second table further comprises a stop attached to the table at the end of the table opposite from the end to which the pallet is attachable.

6. The apparatus of claim 1 further comprising: a second table, rotatable in clockwise and counterclockwise directions, having means for attaching and detaching a stack support member at both opposing ends; and, a stop attachable and detachable to the second table interchangeably with the stack support member.

7. The apparatus of claim 6 wherein the stack support member is a pallet.

8. The apparatus of claim 1 further comprising a stop attached to the second end of the second table at the end opposite said at least one end.

9. The apparatus of claim 2 further comprising: means for disengaging and transporting the pallet from the second table, when the table surface is in the vertical position.

10. The apparatus of claim 9 wherein the means for disengaging and transporting the pallet comprises a cart having (a) means for lifting the pallet with the stack thereon; and, (b) means for pressing downwardly on the top of the stack when the pallet is lifted.

11. The apparatus of claim 2 wherein the pallet has wheels, and; wherein, when the second table is rotated to a vertical position, the wheels of the dolly contact a floor surface.

12. The apparatus of claim 1 further comprising: a source device for continuous delivery of shingled fanfold sheet to the first end of the first table at a first speed; wherein the first table first conveying means moves the shingled fanfold sheet lengthwise at a speed which is less than said first speed.

13. The apparatus of claim 1 further comprising:

a source device having conveying means for continuous delivery of shingled fanfold sheet, in general alignment with the length of the first table;

a third table, positioned between the source device conveying means and the first table; the third table having means for conveying shingled sheet received from the source device to the first table;

wherein shingled sheet provided by the source device conveying means is continuously delivered to the third table; and thereafter delivered to the first table.

14. The apparatus of claim 13 further comprising:

source device conveying means moving shingled fanfold sheet at a first speed;

first table first conveying means running at a speed less than said first speed; and, third table conveying means running at a speed which is less than said first speed and greater than said first conveying means speed.

15. The apparatus of claim 1 wherein the pivot axis of the second table is approximately at the midpoint of the length of the second table.

16. The apparatus of claim 1 wherein the pivot axis of the second table is located proximate the second end of the second table.

17. The apparatus of claim 1 wherein the pivot axis translates in space toward an end of the second table during tilting of the second table.

* * * * *